Figure 6:
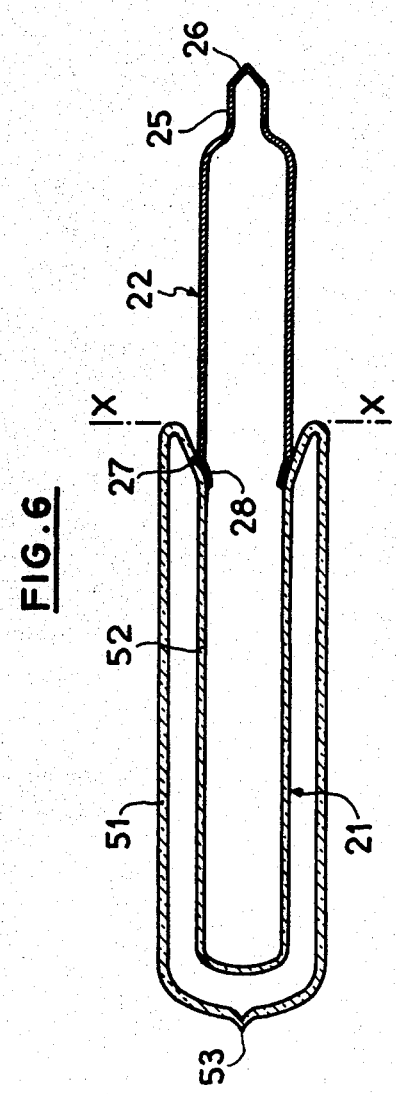

United States Patent [19]

Grauleau et al.

[11] 4,153,041

[45] May 8, 1979

[54] SOLAR ENERGY COLLECTOR

[75] Inventors: Didier Grauleau; Jean Mourier; Arvind Shroff; Jacques Villain, all of Paris, France

[73] Assignees: Thomson-Brandt; Compagnie des Lampes, both of Paris, France

[21] Appl. No.: 791,017

[22] Filed: Apr. 26, 1977

[30] Foreign Application Priority Data

Apr. 30, 1976 [FR] France .................. 76 13002

[51] Int. Cl.² .................................................. F24J 3/02
[52] U.S. Cl. .................................... 126/271; 165/105
[58] Field of Search .............. 126/270, 271; 237/1 A; 165/105; 202/234; 203/DIG. 1

[56] References Cited

U.S. PATENT DOCUMENTS

| 2,917,817 | 12/1959 | Tabor | 126/270 |
|---|---|---|---|
| 3,875,926 | 4/1975 | Frank | 126/271 |
| 3,923,038 | 12/1975 | Cutchaw | 126/271 |
| 3,981,293 | 9/1976 | Gillery | 126/271 |
| 4,055,163 | 10/1977 | Costello et al. | 126/271 |
| 4,059,093 | 11/1977 | Knowles et al. | 126/271 |
| 4,067,315 | 1/1978 | Fehlner et al. | 126/271 |

*Primary Examiner*—James C. Yeung
*Attorney, Agent, or Firm*—Roland Plottel

[57] ABSTRACT

A device for collecting solar energy and conveying it to a zone to be heated. It comprises a tube in two parts, the first part (evaporator) being surrounded by a vacuum and being covered with a heat absorbing material and exposed to the solar radiation. The tube contains a fluid which vaporized in the first part and absorbs heat and condenses in the second part and gives up the previously-stored heat. The fluid in the liquid phase is returned to the first part by a capillary system.

4 Claims, 9 Drawing Figures

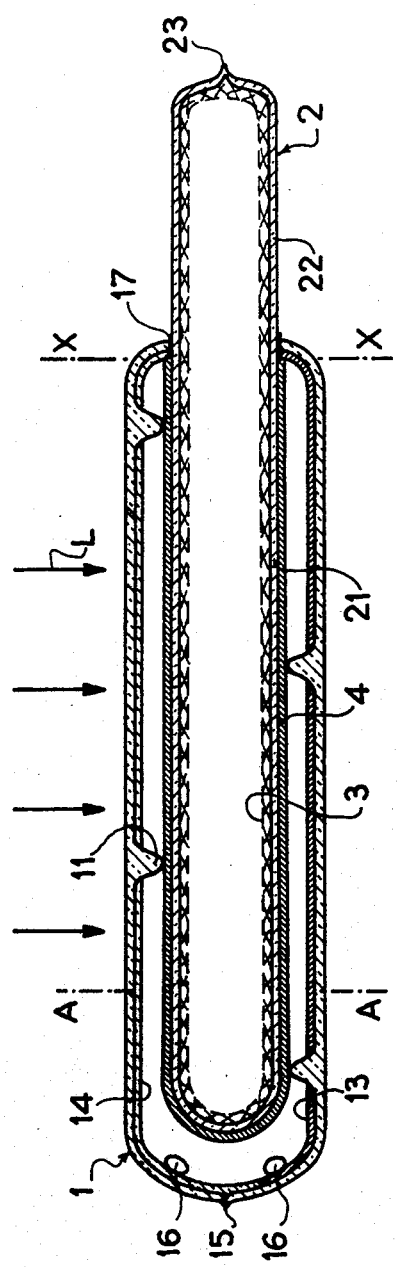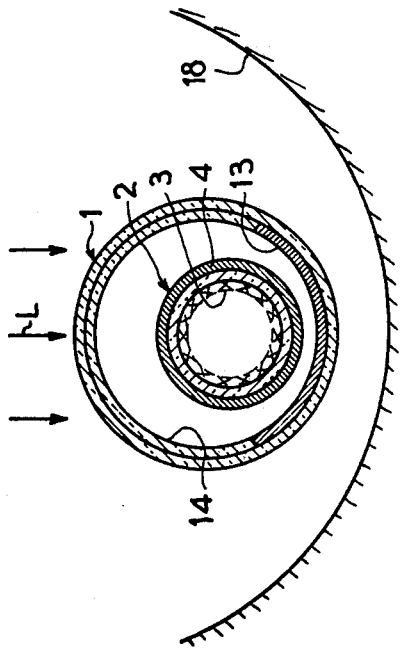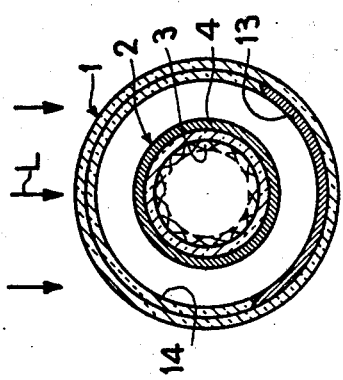

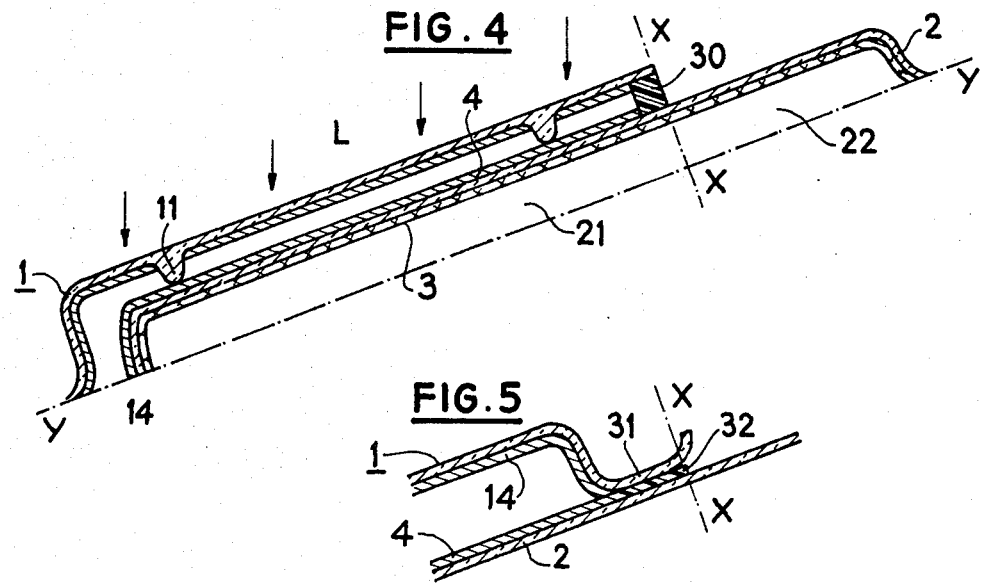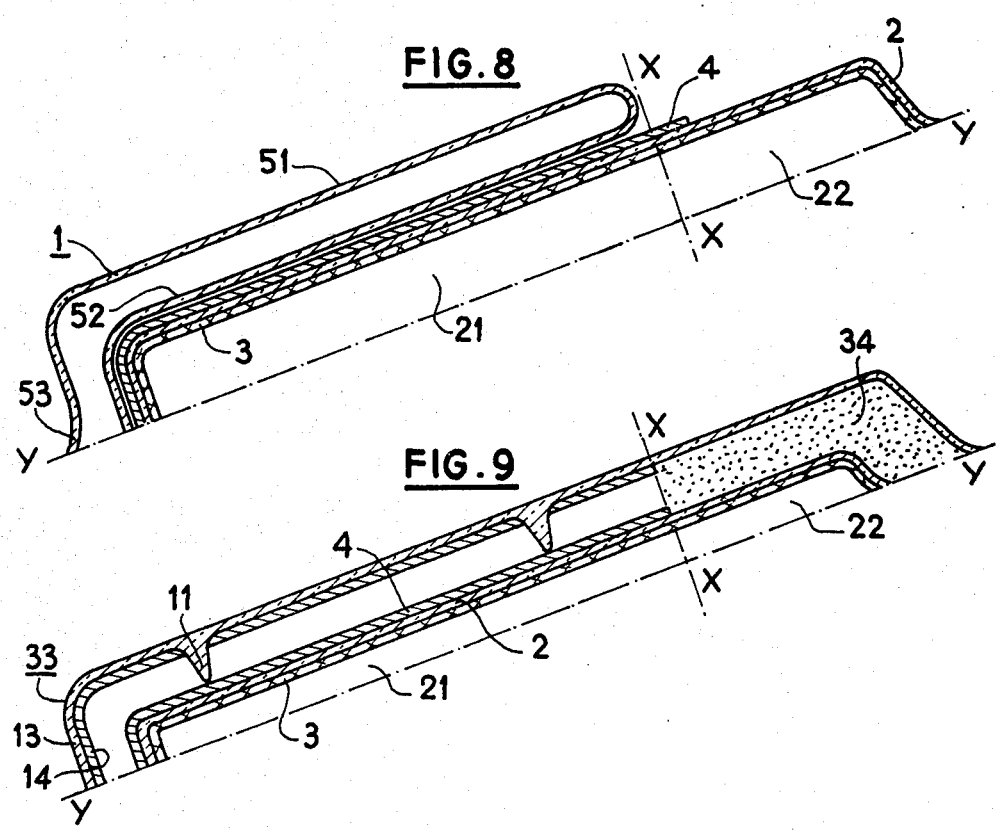

SOLAR ENERGY COLLECTOR

The present invention relates to a solar energy collector for receiving the energy and conveying it to the zone to be heated.

Various modes of recovering solar energy are known, among which may be mentioned:

photovoltaic cells which convert the solar radiation into electricity;

the glass-house effect which raises the temperature of a mass of air circulating at low velocity;

the raising of the temperature of a liquid mass.

As concerns the last mode of recovery, different systems exist: some heat a mass of stagnant liquid by concentration of the solar flux; others employ a circulation of liquid between two containers, the liquid being heated, for example, by the glass-house effect in the first container and/or during its circulation.

The common drawback of these various systems is the low efficiency they generally have.

An object of the present invention is to provide a solar energy collector comprising:

a closed first envelope filled with a fluid at saturating vapour pressure, comprising at least two parts termed respectively an evaporator and a condenser, said evaporator being exposed to the incident solar radiation, said fluid therein passing to the vapour state, said vapour condensing in said condenser which is placed outside said incident radiation for giving up the heat to the surrounding medium;

means for returning the fluid in a liquid phase to the evaporator, said means being placed inside said first envelope;

a closed second envelope placed around said first envelope at least in the evaporator part thereof;

thermal insulation means between said envelopes in the region of said evaporator.

Figure 7:
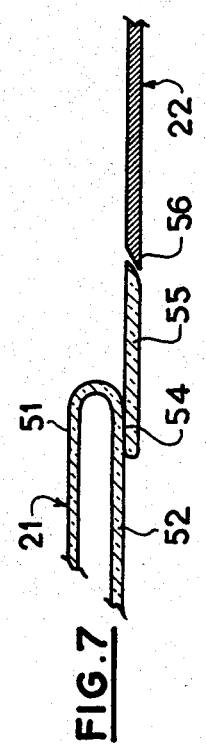

Other objects, features and results of the invention will be apparent from the ensuing description with reference to the accompanying drawings which represent:

FIG. 1, a longitudinal sectional view of a first embodiment of the device according to the invention;

FIG. 2, a cross-sectional view of the device shown in FIG. 1;

FIG. 3, a cross-sectional view of a modification of the embodiment of the preceding Figures;

FIG. 4, a longitudinal sectional view of a variant of FIG. 1;

FIG. 5, a modification of the preceding Figure;

FIG. 6, a longitudinal sectional view of a second embodiment of the device according to the invention;

FIG. 7, a modification of FIG. 6;

FIG. 8, a longitudinal sectional view of a third embodiment of the device according to the invention;

FIG. 9, a longitudinal sectional view of a fourth embodiment of the device according to the invention.

FIG. 1 shows a closed tube 2, comprising two parts 21 and 22, the separation of which is illustrated by an axis XX. The tube 2 is for example of a cylindrical shape. It can be made of metal or transparent material, such as glass, as shown on the Figure.

The first part 21 of the tube 2, termed an evaporator, is placed under a vacuum in a second envelope 1 and is exposed to the solar radiation (arrows L). It is shown in cross-section, taken on line AA, in FIG. 2.

The envelope 1 is preferably constituted by a transparent material, for example glass, which is covered on it inner wall with a filtering layer 14 which has the property of transmitting the solar radiation and reflecting infrared rays. This layer 14 may be, for example, of indium oxide $In_2O_3$. It permits limiting losses of heat by radiation. Further, in order to improve the concentration of the incident flux (L) on the tube 2, the layer 14 does not extend over the whole of the lower surface of the envelope 1 but only on its upper part which receives the solar flux, the lower surface being covered with a reflecting layer 13 which is for example metallic. The envelope 1 has spike portions 11 which are metallic, or made of glass or other material, and enable the tube 2 to be maintained either in the centre of the envelope 1, as shown in FIGS. 1 and 2, or off-centre as shown in FIG. 3, which moreover represents the same elements as FIG. 2. The last-mentioned modification may be preferred in order to place the tube 2 at the focus of a reflector 18 disposed outside the whole of the device and adapted to improve the operation of the system by concentrating the solar flux toward the evaporator.

A vacuum is produced within the envelope 1 by means of a appendix 15 so as to avoid losses of heat by conduction and convection. In practice, the pressure within the envelope is then lower than $10^{-4}$ mm of mercury, that is to say about $1.3 \cdot 10^{-2}$ Pascal. This vacuum is maintained by means of devices 16 which are known, in particular in the field of electronic tubes, under the name of getters and have for function to absorb the molecules present in the envelope 1 and are made from, for example, an alkaline metal. However, it is also possible to maintain in the envelope 1 a neutral gas at low pressure (a few mm of mercury) such as a heavy rare gas (for example Xenon).

The junction between the envelope 1 and the tube 2 is produced in FIG. 1 (at 17) by an intimate fusion of the glasses 1 and 2, or by a sealing by means of a glass-glass adhesive or any other material employed in the vacuum art.

That junction can be also produced as shown on FIGS. 4 and 5.

In FIG. 4, which is a longitudinal sectional view and shows the same elements as FIG. 1, and the symetry axis of which is refered to as YY, the junction of the envelope 1 with the tube 2 is produced by means of a thick joint 30, the functions of which are the following:

ensure the seal between the envelope 1 and the exterior at the temperature of operation of the device;

have a coefficient of expansion in the neighbourhood of those of the envelope 1 and tube 2;

have a low degassing rate at the temperature of operation of the device so as to avoid polluting the atmosphere prevailing between the envelope 1 and the tube 2.

A joint satisfying these conditions may be constituted by an epoxy resin (for example that known under the trademark ARALDITE), a silicone elastomer or an enamel.

In FIG. 5, which merely shows the tube 2 and the envelope 1 in the region of their junction, there is shown a modification of the preceding joint which is here a thin joint 32 placed between the tube 2 and the narrowed end 31 of the envelope 1.

The functions of this joint 32 are the same as before and as concerns its production a polymerizable resin is suitable. It may also be produced by means of a glass-metal weld.

Note that in FIG. 5 the layers 14 and 4 are represented as being limited by the joint 32. This is merely by way of illustration, and the layers 14 and 4 may be extended under the joint 32.

In the case where the tube 2 is metallic, the constituent metal must be so chosen that it is possible to weld it to the glass constituting the envelope 1. By way of example, a tube of KOVAR (trademark), or at least covered with KOVAR, is suitable.

In its part evaporator 21, the tube 2 is covered with an absorbent layer 4 constituted by material having a low coefficient of emissivity ($\epsilon$) and a high coefficient of absorptivity ($\alpha$) so that the ratio $\alpha/\epsilon$ be as high as possible. There may be mentioned, by way of example, zinc, molybdenum, tungsten, etc.

The tube 2 contains a liquid impregnating a capillary system 3 in the shape of glove finger placed against the inner wall of the tube and constituted, for example, by a cloth or gauze of cotton, artificial textiles or glass fibre or by a metal cloth. The capillary system may also be formed by threads, for example of cotton, artificial fibres or glass, or metallic threads arranged in a spiral or in the form of a squirrel cage. This capillary system is placed closely against the inner wall of the tube by means of a suitable device acting as a spring, or under the effect of the tendency to expand that the system has naturally or which has been imparted thereto artificially. The system 3 can be also constituted, for example, as described in the main patent, or by sintered glass, sintered metal or a porous body, the essential feature being that it is both insoluble in the liquid in which it is bathed and sufficiently adherent to the wall of the tube 2 that it cannot be detached from this wall by the liquid.

The chosen liquid must have a high latent heat of vaporisation so as to store a large amount of heat and a partial pressure at boiling point which is high enough to produce vapour in a large amount. Liquids which are suitable are, for example, water, glycol, alcohol, ammonia, or a mixture of these bodies. The liquid is placed in the tube in the following manner: the capillary system 3 is saturated by the fluid in the liquid phase in the case of an absorbent material or it is wetted in the case of a cellular or porous material. Then the vacuum is produced inside the tube 2 by means of the appendix 23, until there is obtained an atmosphere which contain only the vapour of the considered fluid at the saturating vapour pressure.

The device operates in the following manner: the incident solar flux L received by the device vaporized the liquid. The vapour thus produced moves toward the cold point which is the part 22 or condenser, where it condenses and loses its heat to the ambient medium. The condensed liquid then returns to the part 21 or evaporator owing to the effect of the capillary system 3, and the cycle recommences.

In practice, the device as shown in FIG. 1 is secured to a support, for example along the axis XX, and the condenser 22 is put in contact with the fluid to be heated.

In some applications it may be preferred to have a metallic condenser which permits a better exchange of heat to the element to be heated. This has been shown in FIG. 6.

The device shown in FIG. 6 again consists of two parts: the evaporator 21 and the condenser 22 separated by the axis XX. However, the capillary system 3 of the preceding Figures has not been shown in order to render the drawing more clear.

The evaporator 21 is constituted by a tube having a double wall (51 and 52) in the form of a Dewar tube. It is, for example, of glass. It terminates in an appendix 53 which serves to produce a vacuum inside the tube. The inner surface of the outer wall 51 of the evaporator 21 may be covered in its upper part with a filtering layer (not shown in FIG. 6) similar to the layer 14 of the preceding Figures. Likewise, this surface may be covered in its lower part with a reflecting layer (not shown) similar to the layer 13 of the preceding Figures. This reflecting layer can also be positioned on the outside of the Dewar tube, that is to say on the outside surface of the wall 51.

The condenser 22 is constituted by a metallic cylindrical tube which is a good conductor of heat, for example made of copper. It is placed at the open end of the evaporator 21 and the assembly is rendered fluidtight by a seal 27 produced with any material employed in the vacuum art having a low degassing rate and capable of withstanding temperatures at least equal to 150° C. An elastomer joint 28 may be placed between the tubes 21 and 22 in order to compensate for differences in the expansion thereof.

The metallic condenser 22 terminates in a tube 25 of small diameter for the filling of the device with the liquid and for the pumping. The assembly is sealed by pinching (26) the tube 25 and the tinning of the lips 26.

FIG. 7 shows a modification of the preceding glass-metal connection known in the art under the name of the Housekeeper type.

This FIG. 7 shows one end of the transparent tube 21 with its inner surface 52 and outer surface 51. The metallic tube 22 is not sealed directly to the tube 21 but to a thinned-down glass layer 55 by a very thinned-down end 56 of the tube 21. The layer is sealed (54) to the tube 21 by any known means.

FIG. 8 represents a third embodiment of the invention showing the tube 2 identical to that of FIG. 1, that is to say covered on the outside with the layer 4 and on the inside with the capillary system 3.

In this embodiment, the evaporator part 21 of the tube 2 is still surrounded with an envelope 1, but the latter is here in the form of a tube having a double wall 51 and 52 in the shape of a glove finger or of a Dewar tube. It is of a transparent material, for example glass, and terminates in an appendix 53 through which the vacuum was produced. In this version, the tube 2 is merely slid inside the envelope 1. The outer surface of the inner wall 52, that is, that which is in contact with the tube 2, may be covered with the preceding filtering layer 14 and reflecting layer 13. The reflecting layer 13 may also be placed on the outer or inner surface of the outer wall 51.

This structure has in particular the following advantages:
  ease of fabrication;
  interchangeability of one of the elements 1 and 2;
  absence of degassing of the absorbent layer 4 in the vacuum envelope 1.

FIG. 9 represents a fourth embodiment in which the vacuum envelope entirely contains the tube 2.

The tube 2 is identical to that described above.

The envelope which contains it now has the reference 33. It carries on its inner faces, in the evaporator part 21, the layers 13 and 14. In the condenser part 22, the space between the envelope 33 and the tube is filled with a material 34 constituting a thermal bridge between the condenser and the exterior. This material 34 must be a good conductor of heat and have a low degassing rate. A polymerizable resin having a charge of metallic particles is suitable.

The advantage of this version is also a great ease of construction.

The device according to the invention therefore permits in any one of its embodiments described hereinbefore the catching of the solar energy (by its part termed the evaporator located in FIGS. 1, 4, 6, 8 and 9 on the left of axis XX) and its conveyance to the zone to be heated (on the right of axis XX) by means of a closed system with an excellent efficiency (of the order of 90%).

There may be constructed systems comprising an assembly of collectors according to the invention in which the axis XX of separation is common to all the collectors and is embodiment by a sealed joint, the element to be heated being then possibly a fluid which circulates showly along the walls of the condensers.

What is claimed is:

1. A device for collecting solar energy comprising: a closed first envelope filled with a fluid at saturating vapour pressure, comprising at least an evaporator and a condenser, said evaporator being exposed to the incident solar radiation, said fluid therein passing to the vapour state, said vapour condensing in said condenser which is placed outside said incident radiation for giving up the heat to the surrounding medium; means for returning the fluid in a liquid phase to the evaporator, said means being placed inside said first envelope; a closed second envelope located around said first envelope at least in the evaporator part therof; thermal insulation means between said evaporator and an outer surface of said second envelope; and wherein at least the evaporator of said first envelope is covered with a material which absorbs said incident radiation; said absorbent material consists of one material selected from the group constituted by zinc, molybdenum and tungsten; said thermal insulating means comprises a gaseous medium between the evaporator and an outer wall of said second envelope at a pressure lower than atmospheric pressure; said pressure of said gaseous medium being lower than $1.3 \cdot 10^{-2}$ Pascal; said thermal insulating means comprises, at least on the part exposed to the incident radiation of the inner surface of the second envelope, a filtering layer which transmits said incident radiation and reflects the infrared radiation coming from said evaporator; said filtering layer is constituted by indium oxide $In_2O_3$; said thermal insulating means comprises, in a part of the inner surface of the second envelope which is opposed to that exposed to the incident radiation, a layer reflecting said incident radiation; said fluid consists of one fluid selected from a group constituted by water, glycol, alcohol, ammonia and a mixture of said fluids; said means for returning the fluid comprises a capillary system disposed along the inner wall of said first envelope, and said capillary system is constituted by sintered material.

2. A device as claimed in claim 1, wherein said second envelope comprises a double wall in a form of a Dewar tube, the evaporator part of said first envelope being slid inside said Dewar tube.

3. A device as claimed in claim 1, wherein said second envelope is off-centre with respect to said evaporator so that said evaporator is disposed at the focus of a condenser reflector outside said device.

4. A device as claimed in claim 1, wherein said second envelope is placed around the whole of said first envelope, said collector further comprising means for ensuring the thermal connection between said condenser and the exterior of the collector, said means being placed around the condenser between the two envelopes.

* * * * *